May 2, 1939.  R. S. NELSON  2,156,953

ABSORPTION REFRIGERATING SYSTEM

Filed Oct. 18, 1935   2 Sheets-Sheet 1

INVENTOR
Rudolph S. Nelson
BY Harry J. Demarse
ATTORNEY

May 2, 1939.	R. S. NELSON	2,156,953
ABSORPTION REFRIGERATING SYSTEM
Filed Oct. 18, 1935	2 Sheets-Sheet 2
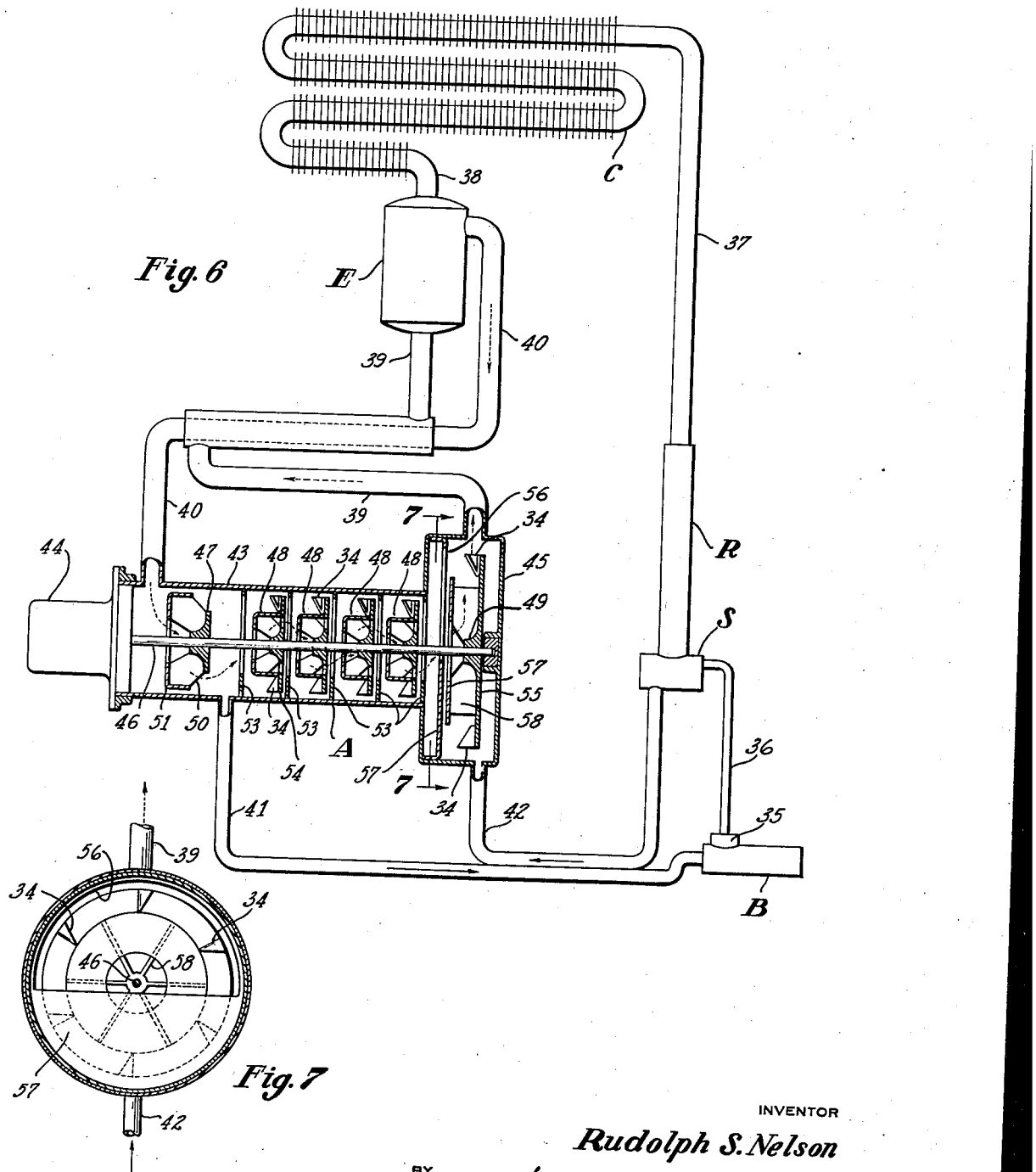
INVENTOR
Rudolph S. Nelson
BY
Harry S. Demarest
ATTORNEY Patented May 2, 1939

2,156,953

UNITED STATES PATENT OFFICE 2,156,953

ABSORPTION REFRIGERATING SYSTEM

Rudolph S. Nelson, North Canton, Ohio, assignor to The Hoover Company, North Canton, Ohio, a corporation of Ohio Application October 18, 1935, Serial No. 45,528

30 Claims.  (Cl. 62—119.5)

This invention relates to continuous absorption refrigerating systems of the type in which an inert gas is employed, and more particularly to absorbers adapted for use in such systems, and to means for circulating fluids therein.

It is an object of the present invention to provide improved means for circulating fluids in an absorption refrigeration system, and more particularly a novel means for bringing a solvent for a refrigerant into intimate relation with a mixture of gases containing a refrigerant.

It is a further object of the invention to provide fluid circulating means which may be hermetically sealed in an absorber of an absorption refrigerating system, and which in addition to causing both a gas and a liquid to flow in a desired direction through the absorber, brings the gas and liquid into very intimate contact and throws them about and in contact with each other and with the inside of the absorber vessel so as to improve the absorption and aid in the transfer of the heat of absorption to some heat absorbing medium on the outside of the vessel.

It is another object of the invention to provide an absorber for a refrigerating system with power driven means which may be hermetically sealed therein and which causes liquid to flow upwardly through the absorber while contacting gas caused to flow downwardly through the absorber.

Other objects reside in certain novel features of the arrangement and construction of parts, and will be apparent from the following description taken in connection with the accompanying drawings in which Figure 1 is a diagrammatic representation of a continuous absorption refrigerating system with the absorber thereof shown in cross section, the figure illustrating one form of the present invention;

Figure 6 is a diagram representing a continuous absorption system in which a modified form of absorber, constructed in accordance with the present invention is incorporated, the absorber being shown in cross section, and Figure 7 is a transverse cross sectional view of the absorber shown in Figure 6, the view being taken on the line 7—7 thereof.

Figure 1:
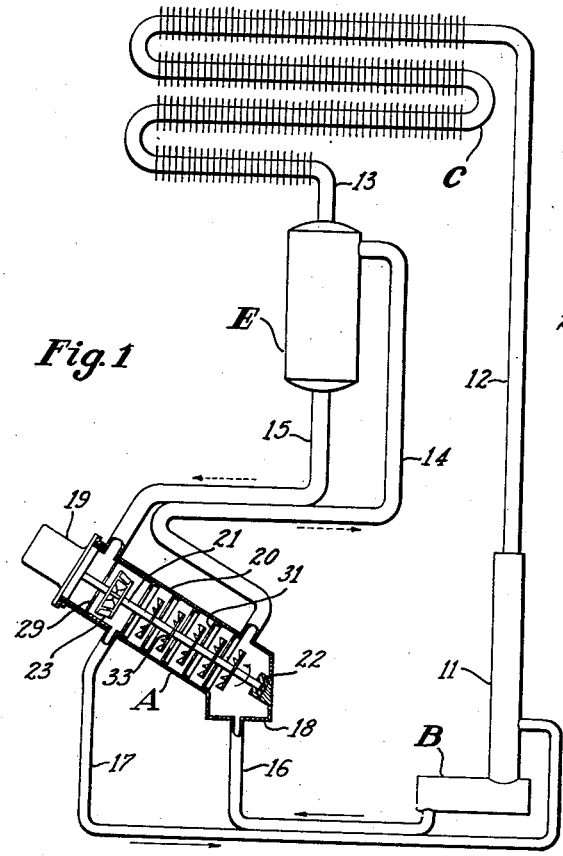

Referring to the drawings in detail, and first to the diagram of Figure 1, it will be seen that a continuous absorption refrigerating system is illustrated as consisting of a boiler B, a condenser C, an evaporator E and an absorber A, these parts being connected by various conduits to form a complete hermetically sealed refrigerating system.

The boiler B may consist of a horizontal vessel to which heat may be supplied by a gas burner or other suitable means in accordance with known practice. A dome or vertically extending pipe 11 is connected to the upper side of the main boiler vessel so that refrigerant vapor generated in the boiler may pass up through this dome and from there into the condenser C through a conduit 12.

As the refrigerant is cooled and liquified in the condenser, it is fed into the evaporator E through the conduit 13. The evaporator may consist of a vertically disposed vessel having baffle plates therein, in accordance with known construction. As the refrigerant trickles downwardly over the baffle plates, it evaporates into the inert gas in the evaporator to produce a cooling effect. The top of the evaporator is connected to the bottom of the absorber by means of a gas conduit 14 while the top of the absorber is connected to the bottom of the evaporator by means of a gas conduit 15. These inert gas conduits may be in heat exchange relation, as illustrated. They provide means enabling inert gas to flow in a circuit between the evaporator and the absorber.

In the absorber, inert gas, together with the refrigerant gas carried with it from the evaporator, comes in contact with absorption liquid. The absorption liquid is circulated between the absorber and the boiler, the lower portion of the absorber being connected to the boiler by means of the conduit 16, while the upper part of the absorber is connected to the boiler by means of the conduit 17. The liquid conduits 16 and 17 may also be in heat exchange relation with each other as indicated.

Figure 2:
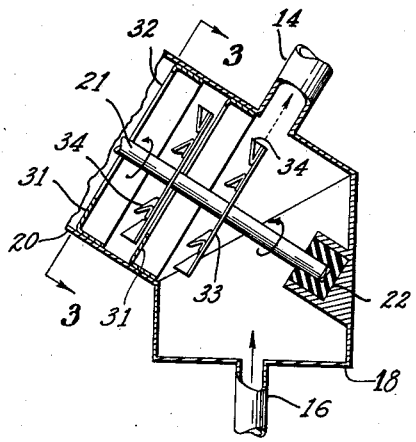
Figure 2 is an enlarged fragmentary sectional view of the lower portion of the absorber illustrated in Figure 1.

An important feature of the present invention is the absorber assembly. As shown in Figures 1 and 2 the absorber consists of a metal cylinder 20 disposed in an inclined position with a vertically extending cylindrical portion 18 secured to the lower end to form a reservoir for storing absorption liquid.

An electric motor 19 is mounted on the upper end of the absorber vessel 20. The rotor of this motor is hermetically sealed from the atmosphere but may be caused to rotate as the result of magnetic fluxes transmitted through the wall surrounding the rotor, the field of the motor being mounted on the outside. Motors of this type are well known and need not be described here in detail.

The electric motor 19 is mounted on and causes rotation of a shaft 21 disposed along the axis of the main cylinder 20 of the absorber. The shaft is supported by suitable bearings, one of which is illustrated at 22.

Figure 5:
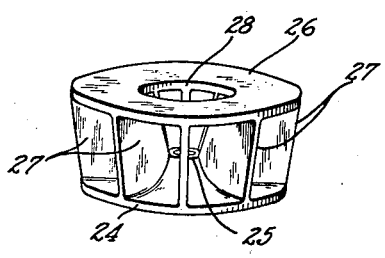
Figure 5 is an enlarged perspective view of the gas circulating device used in the arrangement of Figure 1.

One or more gas circulators 23 may be mounted on the shaft 21, preferably above the normal liquid level in the absorber. These are preferably arranged to cause the inert gas to enter the absorber through the conduit 15, pass downwardly therethrough, and back to the evaporator through the conduit 14. In Figure 1 only one gas circulator 23 is shown. As best shown in Figure 5, it may consist of a lower shroud 24 mounted on a hub 25 and an upper shroud 26, these shrouds having blades 27 disposed therebetween. The upper shroud has an opening 28 therein through which gases may be drawn and expelled from the periphery of the blades due to centrifugal action. As shown in Figure 1, the upper shroud 26 is disposed adjacent a plate 29 secured in the absorber vessel, this plate having a central opening adjacent to the opening 28 in the shroud 26.

In case the gas circulator 23, in an arrangement like that of Figure 1, is insufficient to circulate the inert gas at the desired rate, additional gas circulating means may be provided either in the absorber or in one of the conduits connected thereto, and it is within the purview of the invention to provide other or additional means for circulating the inert gas, as for example the arrangement disclosed in the co-pending applications of Nelson et al., Serial No. 25,732, filed June 10, 1935, and Serial No. 26,554, filed June 14, 1935.

Figure 3:
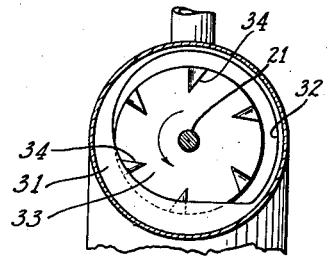
Figure 3 is a transverse cross sectional view of the absorber shown in Figure 2, the view being taken on the line 3—3 thereof.
Figure 4:
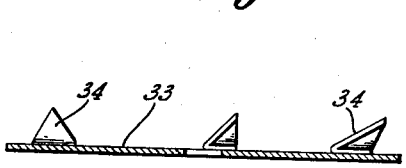
Figure 4 is an enlarged cross sectional view of one of the impeller blades used in the arrangement of Figures 1, 2, and 3.

In the arrangement of Figures 1 to 5, absorption liquid is caused to circulate upwardly through the inclined upper portion 20 of the absorber from the reservoir provided by the lower portion 18 thereof. To attain this end, a number of baffle plates, or liquid retaining members 31 are secured in spaced relation in the vessel 20. Each of these baffle plates 31 has an opening 32 therein, which opening, as illustrated in Figure 2, is near the upper edge of the baffle. As is best shown in Figure 3, the opening 32 is circular for most of its circumference, but also includes a cut-away portion on one side so that the lower inner edge of the baffle is substantially horizontal and offset from the center. The baffle plates 31 may be provided with flanges as shown for fixing them within the absorber vessel, as by welding, and each should be fitted sufficiently tight to provide a seal, especially on the lower portion of the vessel 20.

Mounted for rotation with the shaft 21 and positioned adjacent and slightly above each baffle plate 31, is a fluid circulating and splashing device. Each of these devices consists of a disc 33 upon the upper face of which a number of triangular-shaped actuators 34 are mounted, these actuators being disposed at an angle to the surface of the discs so as to recede from the direction of rotation of the disc. In Figures 2 and 3 the direction of rotation of the discs is indicated by the arrows around the shaft 21. As best shown in Figure 3, the actuators 34 are in the shape of a right triangle, one leg of which is disposed along a radius of the disc while the other leg is tangential to the circumference.

It has been found by experiment that with a construction such as just described above, rotation of the discs 33 causes liquid supplied to the reservoir 18 through pipe 16 to travel upwardly through the absorber. During normal operation, each disc dips into a pool of liquid, the pools being formed above the lower side of the baffle plates 31 and in the reservoir chamber 18.

The mounting of the fluid actuators 34 described above upon the disc 33 is such that as the lower portion of each disc dips into the pool of liquid along the lower side of the inclined absorber vessel, the liquid is splashed or sprayed upwardly, and at the same time thrown forwardly parallel to the shaft, so that it flows through the opening 32 in the baffle plate 31 immediately above the disc. While ordinary circular openings in the baffle plates 31 will cause the liquid to flow upwardly through the absorber under the influence of the liquid circulators as described, an opening like that shown in Figure 3 has been found to be particularly advantageous.

When the electric motor 19 is driving the shaft 21 with the gas circulator 23 and the liquid circulators 33 thereon, it will be seen that inert gas is caused to flow downwardly through the absorber while the absorption liquid is caused to flow upwardly therethrough, and at the same time comes into intimate contact with the gas, the gas being blown through a spray of the liquid. This causes rapid absorption and materially improves the operating characteristics of the entire system. Another advantage is that as the liquid is thrown around the interior of the absorber vessel, it enables a quick transfer of heat to some cooling medium such as air which may be caused to flow around the outside of the absorber or in contact with heat radiating fins (not shown) which may be mounted upon the absorber. An inclined vessel like that used in the absorber of Figure 1 is particularly suitable for effecting a rapid heat transfer.

Assuming that the absorption system shown in Figure 1 is charged with ammonia, water and nitrogen as refrigerant, absorbent, and inert gas respectively, it will be apparent to those skilled in the art that three fluid cycles are set up. The ammonia passes from the boiler B, where it is generated from the water, through the conduit 12 to the condenser C, where it is liquefied and flows into the evaporator through the conduit 13. In the evaporator the ammonia evaporates into the nitrogen to produce a cooling effect and is conveyed to the absorber through the conduit 15. In the absorber the ammonia is absorbed in the water circulating therethrough, and flows with the water through the conduit 17 back to the boiler.

At the same time the water is circulated between the boiler and the absorber, flowing from the boiler through the conduit 16, into the sump 18, where it is picked up by the lower liquid circulator 33 and thrown above the lower baffle plates 31, the successive liquid circulators pumping the water from a level above one baffle plate to the next higher baffle plate until the liquid reaches the level of the point of connection of the conduit 17 to the absorber when it flows back to the boiler through this conduit. It will be apparent that with this construction the boiler can never boil dry, even though the motor 19 should fail.

While the water and ammonia are circulating as described above, the nitrogen may be circulated between the evaporator and the absorber, flowing downwardly from the evaporator through the conduit 15, then downwardly through the absorber and back to the evaporator through the conduit 14. It is of course within the purview of the invention to circulate this inert gas in the opposite direction to that just described by reversing the connections of the conduits 14 and 15 to the absorber or by using a fan which drives the inert gas into the conduit 15 so that the gas flows upwardly through the absorber. Gas fans capable of this kind of circulation are disclosed in the co-pending application of C. C. Coons, et al., Serial No. 23,568, filed June 7, 1935. The best operation is obtained when the liquid and gas flow as illustrated, however.

In the arrangement of Figures 1 to 5 the absorber is disposed in an inclined position and the entire liquid pumping means is disposed within the absorber. In the arrangement of Figures 6 and 7 a different form of absorber is disclosed and the absorbed is used in a system in which a vapor lift pump of known construction is associated with the boiler.

Like the arrangement of Figure 1, the system of Figure 6 includes a boiler B, a condenser C, an evaporator E, and an absorber A as essential elements, and in general these devices function the same as in the arrangement of Figure 1. The boiler B of the arrangement of Figure 6 has a dome 35 to which a small conduit 36 is connected. This conduit passes upwardly to join a gas separation chamber S. The conduit 36 serves as a gas lift-pump in accordance with known construction, liquid being lifted from the boiler B to the gas separation chamber S as vapor generated in the boiler passes upwardly through this same conduit. A rectifier R is connected to the top of the gas separating chamber and to a conduit 37 which leads to the top of the condenser C. Refrigerant condensing in the condenser passes through the conduit 38 to the evaporator. The evaporator which may be constructed the same as the evaporator in Figure 1 is connected to the absorber through two conduits 39 and 40, a portion of the conduit 39 surrounding the conduit 40 so as to effect a good heat transfer. The absorber is also connected to the boiler by means of the conduit 41 and to the gas separation chamber by means of the conduit 42, these two conduits being preferably in heat exchange relation.

The absorber itself of Figures 6 and 7 consists of a horizontally disposed cylinder 43 having an electric motor 44, like the motor 19 of Figure 1, secured at one end, and an enlarged cylindrical casing or compartment 45 mounted at the other end. A shaft 46 extends longitudinally through the absorber and is driven by the electric motor 44. The shaft carries a number of fluid circulating elements, there being a gas fan 47 mounted near the left end of the shaft as viewed in Figure 6, a plurality of combined gas fans and liquid circulators 48 located along the central portion of the shaft 46, and a device 49 on the right hand end of the shaft which may be termed a combined main liquid pump and gas agitator.

The gas fan 47 consists of a hub structure with a plurality of blades 50 secured thereto, and an outer shroud member 51 which is of such a shape as to force gas which enters through the central openings therein to be blown to the right as it enters the left hand end of the absorber vessel 43 through the conduit 40. Any other suitable gas driving means could be used in place of this fan, and in case one fan is insufficient to provide the sufficient amount of gas circulation, a plurality may be employed.

The combined gas and liquid circulators marked 48 in the arrangement of Figure 6 cooperate with baffle plates 52 which are mounted in the vessel 43 in spaced relation and alternated with the elements 48. The elements 48 aid the gas fan 50 in driving the gas to the right. At the same time they cause movement of liquid to the left in the absorber vessel, the pumping of the liquid being the same, or practically the same as the pumping of the liquid in the absorber of Figure 1.

The central portion of the fluid circulating element 48 is identical in construction with that of the gas circulator 7, except slightly smaller. In order to circulate the liquid discs, 54 are integral with the hubs of the fluid circulator 48, and are provided with liquid impellers 34 identical with the impellers 34 of the arrangement Figures 1 to 5. The discs 54 have openings therein so as not to interfere with the action of the fan blades in driving the gas.

At the right hand end of the absorber in the arrangement of Figure 6 the enlarged portion 45 serves as a sump or reservoir in which liquid not in transit remains during the operation of the system. Liquid is lifted from the lower portion of this chamber by liquid impeller elements 34 identical in construction with those previously described, mounted on a disc 55 carried by the shaft 46. As the disc 55 rotates, liquid is lifted over a semi-circular opening 56 in a partition 57 which divides the chamber 45 into two parts. After being lifted to the left hand side of the partition 57 the liquid flows over the first baffle 53 and then over the successive baffles 53 under the influence of the fluid circulators 48 until it leaves the absorber through the pipe 41. The main liquid circulator 49 also includes fan blades 58 which aid in causing the gas to flow from left to right in the absorber, but the action of these blades 58 is perhaps more effective in causing turbulence than gas circulation since the entire upper portion of the dividing partition 57 is cut away to allow the gas to circulate therethrough. This construction aids in bringing the absorption liquid and the gas into intimate contact.

The operation of the arrangement of Figure 6 will be apparent from the description given above in connection with Figure 1, the fluid circulation being the same. Except for the absorber, and the manner in which the inert gas conduits are connected thereto, and the boiler system, the construction is also the same as that in Figure 1. An important difference, however, is the liquid pumping means. In Figure 1 the liquid flows by gravity from the upper portion of the absorber through the boiler and back to the lower portion of the absorber, where it is again lifted by the pump. In the arrangement of Figure 6 the absorption liquid flows by gravity from the absorber into the boiler B where it is lifted by a vapor lift pump 36 to the gas separating chamber S from which it in turn flows by gravity back to the lower portion of the absorber. There are thus two pumps in series in the arrangement of Figure 6, one being power driver and the other operated by vapor generated in the boiler.

While only two embodiments of the invention have been shown and described herein it is obvious that various changes may be made, and the two absorbers shown used interchangeably in the systems shown or in various other systems. Other changes will be apparent to those skilled in the art, without departing from the spirit of the invention or the scope of the annexed claims.

I claim:

1. An absorber adapted for use in an absorption refrigerating system, said absorber consisting of a closed vessel, means in said vessel for causing absorption liquid to pass upwardly therethrough and for causing the formation of a number of pools of absorption liquid and means for bringing gas to be absorbed into intimate contact with the absorption liquid in said pools.

2. An absorber adapted for use in an absorption refrigerating system in which an inert gas is employed as a pressure equalizing medium, said absorber consisting of a closed vessel, means in said vessel for conveying absorption liquid upwardly therethrough and means in said vessel for causing inert gas to circulate downwardly therethrough, the arrangement being such that the gas and liquid are brought into intimate contact as a result of the upward movement of liquid against the downward movement of gas.

3. In an absorber adapted for use in an absorption refrigerating system, an arrangement for causing liquid to pass upwardly therethrough and for causing the liquid to come in intimate contact with gas to be absorbed at a number of places in the absorber, said arrangement including a number of baffle plates located at different levels and power driven means for splashing liquid from one baffle plate to another at a higher level.

4. In an absorber adapted for use in an absorption refrigerating system, an arrangement for causing liquid to pass upwardly therethrough and for causing the liquid to come in intimate contact with gas to be absorbed at a number of places in the absorber, said arrangement including means for causing the formation of pools at a number of different levels and power driven means for conveying liquid from one pool to another at a higher level.

5. In an absorber adapted for use in an absorption refrigerating system, an arrangement for causing liquid to pass upwardly therethrough and for causing the liquid to come in intimate contact with gas to be absorbed at a number of places in the absorber, said arrangement including means for causing the formation of pools at a number of different levels, power driven means for conveying liquid from one pool to another at a higher level and power driven means adjacent one or more of said pools for blowing gas over the surface thereof.

6. In an absorber adapted for use in an absorption refrigerating system, an arrangement for causing liquid to pass upwardly therethrough and for causing the liquid to come in intimate contact with gas to be absorbed at a number of places in the absorber, said arrangement including a number of baffle plates arranged at different levels and having openings therein and power driven means for throwing liquid through said openings.

7. In an absorber adapted for use in an absorption refrigerating system, an arrangement for causing liquid to flow therethrough and for causing the liquid to come in intimate contact with gas to be absorbed at a number of places therein, said arrangement including power driven means within the absorber for spraying liquid upwardly in contact with the gas at a number of places and a plurality of devices for catching liquid and retaining it at a higher level.

8. An absorber adapted for use in an absorption refrigerating system using an inert gas, said absorber comprising a vessel having baffles therein adapted to cause the formation of a number of pools of liquid therein and power driven means for causing liquid to flow from one pool to another, said means including a plurality of discs mounted for rotation adjacent said baffles, said discs having liquid throwing devices thereon adapted to impart movement to liquid in a direction parallel to the axis of rotation of said discs, said liquid throwing devices comprising pieces of metal disposed at acute angles to the surfaces of the discs and receding from their direction of movement as the discs rotate.

9. An absorber adapted for use in an absorption refrigerating system comprising an inclined vessel, baffle plates mounted in said vessel in spaced relation and adapted to aid in forming a number of pools of liquid along the lower side of said vessel and power driven means associated with said baffles for pumping liquid upwardly through said vessel from pool to pool, said means consisting of impeller elements mounted for rotation about an axis at right angles to said baffles, the arrangement being such that the impeller elements dip into the pools and throw liquid therefrom.

10. An absorber adapted for use in an absorption refrigerating system comprising a vessel having a shaft extending therethrough, a motor for rotating said shaft and means on said shaft for circulating gas and liquid through the absorber and for bringing them in intimate contact, said means including a disc having impeller elements thereon adapted to throw and spray liquid in the direction of its circulation and gas circulating devices immediately adjacent said impeller elements for driving gas through the spray formed by said elements.

11. An absorber adapted for use in an absorption refrigerating system comprising a vessel having a shaft mounted therein, a motor for rotating said shaft and means mounted on said shaft for circulating gas and liquid therethrough and for bringing them in intimate contact, said means including impeller elements adapted to spray and splash the liquid about and lift it from one level to a higher level in the absorber and a gas circulating device for driving gas through the spray formed by said impeller elements.

12. The method of separating a refrigerant gas from a pressure equalizing medium in gaseous phase comprising forming a plurality of parallel, spaced sprays of absorbent liquid for said refrigerant, said sprays being formed from pools of absorbent derived from pools at successively lower elevations, and passing a stream of the gaseous mixture through said sprays and in counterflow to the flow of absorbent from pool to pool.

13. An absorber adapted for use in an absorption refrigerating system of the type in which an inert gas is employed as a pressure equalizing medium, said absorber consisting of a hermetically sealed vessel, power driven means sealed within said vessel for circulating inert gas and gas to be absorbed through said vessel in one direction, and means driven by said power driven means and sealed within said vessel for circulating absorption liquid therethrough counter to the inert gas and gas to be absorbed, said last mentioned means being arranged to bring the gases and liquids into intimate contact as the same are circulated through said vessel.

14. An absorber adapted for use in an absorption refrigerating system, said absorber consisting of a closed vessel, power driven means mounted within said vessel for propelling absorption solution through the vessel and for throwing and splashing the absorption solution about the interior of said vessel as it is being propelled therethrough, and power driven means within said vessel for propelling gas to be absorbed through the absorption solution so thrown and splashed about the interior of said vessel and in the opposite direction thereto.

15. An absorber adapted for use in an absorption refrigerating system in which an inert gas is used as a pressure equalizing medium, said absorber consisting of a closed vessel, power driven means sealed in said vessel for circulating inert gas through the same, power driven means sealed in said vessel for circulating absorption solution through the same, means in said vessel for forming a number of liquid pools, said power driven means including devices adapted to dip into said pools and to splash liquid therefrom about the interior of said vessel and to propel a portion of the liquid so splashed from pool to pool and in a direction counter to the direction of inert gas flow through said vessel.

16. An absorption refrigerating system of the type in which an inert gas is employed as a pressure equalizing medium, having in combination, an evaporator, an absorber, a boiler, inert gas conduits connecting the evaporator and absorber, absorption liquid conduits connecting the absorber and boiler, power driven means for circulating the inert gas between the evaporator and absorber and power driven means for circulating the absorption liquid between the absorber and the boiler, said gas circulating means causing the gas to flow downwardly through the absorber and said liquid circulating means causing the liquid to flow upwardly through the absorber.

17. An absorption refrigerating system of the type in which an inert gas is employed as a pressure equalizing medium, having in combination, an evaporator, an absorber, a boiler, inert gas conduits connecting the evaporator and absorber, absorption liquid conduits connecting the absorber and boiler, power driven means for circulating the inert gas between the evaporator and absorber and power driven means for circulating the absorption liquid between the absorber and the boiler, said gas circulating means causing the gas to flow downwardly through the absorber and said liquid circulating means causing the liquid to flow upwardly through the absorber, said gas circulating means and said liquid circulating means being mounted in said absorber.

18. An absorption refrigerating system having, in combination, a boiler, an absorber extending above said boiler, absorption liquid conduits connecting said boiler and said absorber, power driven means for causing absorption liquid to flow upwardly through said absorber whereby the liquid may flow by gravity from the upper portion of the absorber through the boiler and back to the level of the lower portion of the absorber, and means for forming a number of pools of liquid in the absorber.

19. An absorption refrigerating system of the type in which an inert gas is employed as a pressure equalizing medium, having, in combination, an evaporator, an absorber, a boiler, inert gas conduits connecting the evaporator and absorber, absorption liquid conduits connecting the absorber and boiler, power driven means for circulating the inert gas between the evaporator and absorber and power driven means for circulating the absorption liquid between the absorber and the boiler, said gas circulating means causing the gas to flow downwardly through the absorber and said liquid circulating means causing the liquid to flow upwardly through the absorber, the arrangement of said liquid circulating means being such that a number of pools of liquid are formed in said absorber at different levels.

20. An absorption refrigerating system of the type in which internal pressure differences may be balanced by liquid columns and including a boiler, an absorber extending above said boiler and conduits affording a cycle of circulation of solution between said boiler and said absorber, said cycle of circulation including a column of relatively cool, relatively weak absorption solution and normally standing at a level corresponding to the lower part of said absorber balanced by a column of relatively hot, relatively concentrated absorption solution, a shaft disposed in other than a vertical position and carrying a disc-like rotor, the periphery of which dips into the relatively weak absorption liquid normally standing at a level corresponding to the lower part of the absorber whereby rotation of said shaft causes said solution to be raised to a higher level, thereby creating a liquid pressure head producing said cycle of circulation.

21. Absorption refrigerating apparatus having in combination, a boiler, an absorber extending above said boiler, conduits affording a circulating cycle for absorption liquid including said absorber and said boiler, means for causing gas to be absorbed to flow downwardly through said absorber, and power-driven means for causing absorption liquid to flow upwardly through said absorber in contact with said gas to be absorbed whereby the liquid may flow by gravity from the upper portion of said absorber through the boiler and back to the lower portion of the absorber.

22. That improvement in the art of absorption refrigeration which includes the steps of expelling refrigerant vapor from solution in a generating zone, liquifying the vapor, evaporating the refrigerant liquid to produce refrigeration, conveying absorption solution by gravity from the generating zone to an absorbing zone, flowing the solution upwardly through the absorbing zone, in spray form, flowing refrigerant vapor from the evaporating zone downwardly through the absorbing zone in intimate contact with the solution, and draining absorbing solution from the upper portion of the absorbing zone back to the generating zone.

23. An absorber adapted for use in an absorption refrigerating system, using an inert gas, said absorber comprising a vessel having baffles therein adapted to cause the formation of a number of pools of absorption liquid therein and power driven means for causing liquid to flow from one pool to another, said means including a plurality of discs mounted for rotation adjacent said baffles, said discs having liquid throwing devices thereon extending into the liquid pools for projecting the liquid from the pool into which the disc dips directly into an adjacent pool.

24. An absorber comprising a vessel having a plurality of compartments therein communicating with one another above the bottoms thereof, means supplying lean absorbent to one of said compartments, means supplying a gas to be absorbed to said vessel, and means for conveying absorbent through said vessel comprising power actuated means including a motor sealed within said vessel and operative to transfer absorbent successively from one compartment to another by throwing absorbent to the space occupied by another compartment.

25. An absorber comprising a vessel having a plurality of compartments therein communicating with one another above the bottoms thereof, means supplying lean absorbent to one of said compartments, means supplying a gas to be absorbed to said vessel, and power actuated means sealed within said vessel and including a plurality of means in separate ones of said compartments operative to convey absorption liquid from an inlet to an outlet of said vessel by transferring absorbent successively from one compartment to another, said power actuated means including means to propel gas to be absorbed through said compartments and counter to the direction of flow of said absorbent.

26. The method of separating a refrigerant vapor from a pressure equalizing medium which includes the steps of supplying lean absorption liquid to the bottom portion of an absorption zone, simultaneously conveying absorption liquid upwardly through the absorption zone, passing a gaseous mixture in counterflow to the liquid and in contact therewith, and removing strong absorption liquid from the top portion of the absorption zone.

27. The method of absorbing a refrigerant vapor in an absorbing medium which includes the steps of supplying lean absorbent liquid to the bottom portion of an absorption zone, propelling said absorbing medium upwardly through the absorbing zone in spray form, passing refrigerant vapor to be absorbed through the sprays, and removing strong absorption liquid from the upper portion of the absorption zone.

28. The method of operating an absorption refrigeration system having an evaporator and an absorber and employing a refrigerant, and an absorption medium comprising passing the refrigerant from an evaporating zone into intimate contact with a plurality of pools of absorption medium, such contact being increased by centrifugally generating sprays of liquid from certain of said pools, said sprays being located above the pools from which the same were generated, and then causing a forced circulation of said refrigerant through said liquid sprays whereby the refrigerant is rapidly absorbed by the absorption medium.

29. The method of operating an absorption refrigeration system having an evaporator and an absorber and employing a refrigerant, a pressure equalizing medium and an absorption medium, comprising evaporating the refrigerant into the pressure equalizing medium, passing the mixture of the refrigerant and equalizing medium in gaseous phase into intimate contact with separate bodies of the absorption medium to absorb said refrigerant, forming a spray from and directly above said bodies, and forcibly passing said mixture through said spray.

30. The method of operating an absorption refrigeration system having an evaporator and an absorber and employing a refrigerant, an absorption medium, and a pressure equalizing medium, comprising evaporating the refrigerant into the pressure equalizing medium, forming a pool of the absorption medium, gradually withdrawing portions of said pool and forming a spray thereof, and forcibly circulating the mixture of refrigerant and equalizing medium in gaseous phase through said spray whereby the refrigerant is separated from the equalizing medium by the absorption medium.

RUDOLPH S. NELSON.